United States Patent [19]

Hanson et al.

[11] Patent Number: 5,231,640
[45] Date of Patent: Jul. 27, 1993

[54] FAULT TOLERANT PROCESSOR/MEMORY ARCHITECTURE

[75] Inventors: David G. Hanson, Spring Lake Park, Minn.; Mark A. Salser, Reston, Va.; Charles L. Wallace, Prior Lake, Minn.

[73] Assignee: Unisys Corporation, Blue Bell, Pa.

[21] Appl. No.: 557,060

[22] Filed: Jul. 20, 1990

[51] Int. Cl.$^5$ .................... G06F 15/40; G06F 11/00
[52] U.S. Cl. .................... 371/68.3; 371/24; 371/9.1
[58] Field of Search ............ 371/68.3, 24, 9.1, 21.1, 371/21.2, 10.1

[56] References Cited

U.S. PATENT DOCUMENTS 4,227,244 10/1980 Thorsrud et al. ............ 371/24 X
4,561,094 12/1985 Jackowski et al. ............ 371/24
5,043,984 8/1991 Tomisawa et al. ............ 371/24 X Primary Examiner—Robert W. Beausoliel, Jr.
Assistant Examiner—Allen M. Lo
Attorney, Agent, or Firm—Albert B. Cooper; Glenn W. Bowen; Mark T. Starr

[57] ABSTRACT

A primary processor provides control, address and data signals to a shadow comparison ASIC which also receives corresponding signals from a shadow processor running in delayed lock step with respect to the primary processor. The primary processor is coupled to a system CPU bus which communicates through a memory interface with a DRAM memory. An EDC circuit generates EDC syndrome bits with respect to data written by the primary processor into the memory through the interface. The EDC syndrome bits are stored in memory along with the data. The shadow comparison ASIC includes an identical EDC circuit for generating comparable syndrome bits from the data transmitted from the primary processor to the memory when in the write mode and from the data transmitted from the memory to the primary processor when in the read mode. The syndrome bits generated in the ASIC are compared with those generated at the memory to detect discrepancies indicative of failure when in the write mode and with those stored in the memory to detect discrepancies indicative of failure when in the read mode.

12 Claims, 3 Drawing Sheets

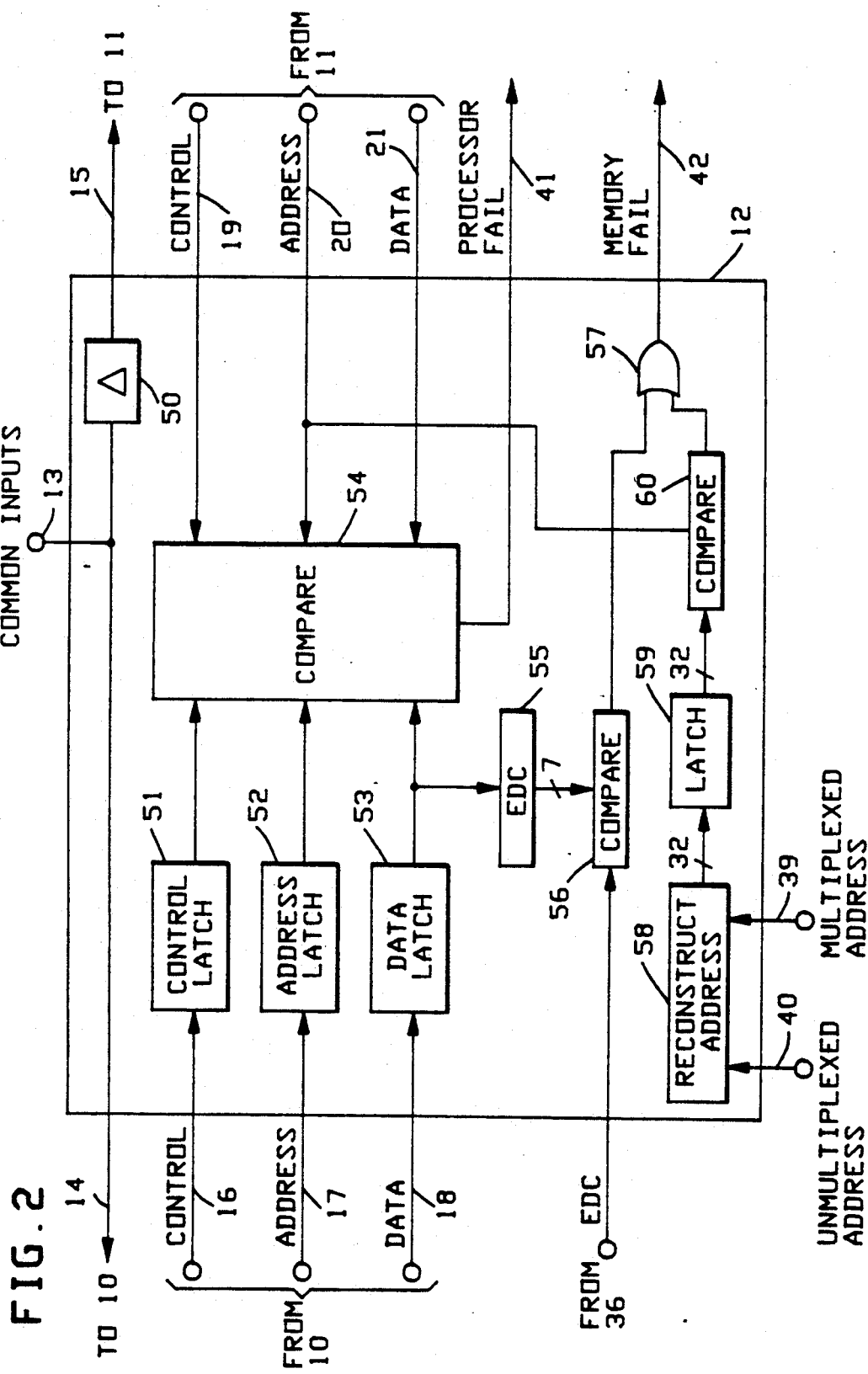

FAULT TOLERANT PROCESSOR/MEMORY ARCHITECTURE

BACKGROUND OF THE INVENTION

1. Field of the Invention

The invention relates to fault tolerant digital computer system architecture particularly with respect to ensuring memory data and address integrity.

2. Description of the Prior Art

Data integrity, or the ability to detect incorrect or corrupted data, is important in many areas of computer applications. Applications where human safety must be assured, such as air traffic control, aircraft control, or weapons guidance and control, are examples of systems in which errors in processing could have catastrophic effects. Other applications which have less severe consequences and yet data integrity is highly desirable are banking and highly secure military classified computing and communications.

A common technique for detecting faults occurring in a processor is to utilize an identical processor in lock step operation with the primary processor and to continuously compare all outputs and control signals of the identical pair. Lock step operation generally provides that a processor pair is clocked from a common source and executes the identical instruction at each clock cycle. If a disagreement occurs between the two processors, the processor system comprising the pair is halted. Such a processor pair may, for example, comprise two identical central processing units (CPU) or two identical floating point units (FPU) or two identical CPU/FPU pairs. Such a system may, for example, be implemented utilizing microprocessors and memory chips, such as dynamic random access memory (DRAM) chips.

Utilizing lock step operation alone does not guarantee that the information presented to the memory is identical to the data at the microprocessors. In all microprocessor based systems there is always at least one level of logic between the CPU/FPU and the memory chips. Such logic may comprise bus transmitters and receivers (transceivers) and address multiplexers (MUX) which provide a memory interface. Such transceivers and multiplexers are required to enable devices other than the processors, such as direct memory access (DMA) devices, to access the memory and to convert the address bus into a format required by the DRAM chips. Typically such address busses comprise 32 bits. Comparison of all of the outputs at the lock stepped CPU/FPU pairs does not guarantee that the data presented to memory will be the same data provided by the processor because such additional levels of logic provide another source of potential faults. Furthermore, the addressing signals provided to the memory by the processor may be corrupted by such memory interface. It is appreciated that data so corrupted and stored undetected in memory or data stored at incorrect addresses can result in catastrophic effects as described above.

SUMMARY OF THE INVENTION

The above disadvantages of the prior art are overcome by comparing signals representative of the data at the processor with comparable signals representative of the data applied to the memory. Preferably, error detection and correction (EDC) signals relative to the data are compared. Additionally, the memory address signals provided at the processor are compared with the memory address signals applied to the memory after propagating through the memory interface logic. The integrity of the processor is also tested by lock step comparisons of control, address and data signals of an identical processor pair. The invention is described in terms of a microprocessor system utilizing DRAM chips, where the DRAM controller is integral with the comparison circuitry of the invention in an application specific integrated circuit (ASIC).

BRIEF DESCRIPTION OF THE DRAWINGS

FIG. 2 is a schematic block diagram illustrating details of the shadow comparison ASIC of FIG. 1.

DESCRIPTION OF THE PREFERRED EMBODIMENT

Figure 1:
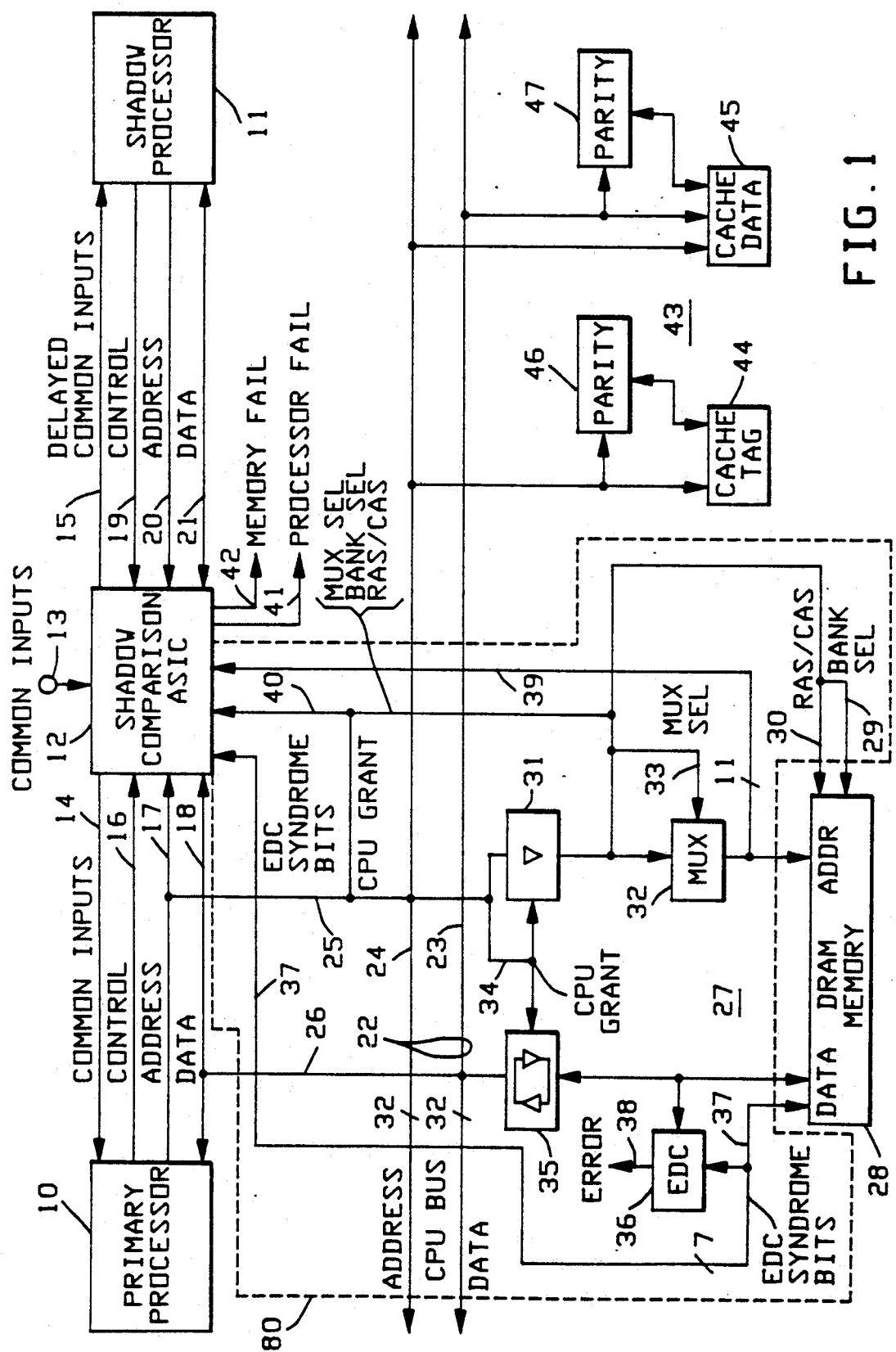
FIG. 1 is a schematic block diagram illustrating the architecture of the present invention.

Referring to FIG. 1, a very high integrity fault tolerant processor architecture is illustrated including a primary processor 10 and an identical shadow processor 11. The shadow processor 11 executes one clock cycle behind the primary processor 10, thereby "shadowing" the operation of the primary processor 10. The processors 10 and 11 may, for example, be implemented utilizing 68030/68882 microprocessor chips. The execution of the shadow processor 11 is delayed by one clock cycle to permit sufficient time for the signals from the primary processor 10 to propagate through the additional logic to the DRAM chips before comparison is effected. Such delay is only required for processors clocked at relatively high frequencies. In the case of the present embodiment, the CPU operates with a 33 MHz clock. The primary processor 10 and the shadow processor 11 are coupled to a shadow comparison ASIC 12 to provide the requisite comparison functions as well as delaying all common inputs to the shadow processor 11, so that the shadow processor 11 executes one clock cycle behind the primary processor 10. The processors 10 and 11 receive common inputs through the ASIC 12 via an input 13. Such common inputs include clock, reset, interrupts, BERR, BGACK and the like. The BERR and BGACK signals are conventional bus error and bus grant acknowledge signals commonly utilized in systems of the type described herein. The common inputs applied at the input 13 are provided to the primary processor 10 via the ASIC 12 and lines 14. The common inputs are delayed by one clock cycle in the ASIC 12 and applied to the shadow processor 11 via lines 15.

The primary processor 10 provides control, address and data signals to the ASIC 12 via lines 16, 17 and 18 respectively Similarly, the shadow processor 11 provides control, address and data signals to the ASIC 12 via lines 19, 20 and 21 respectively. The control signals on the lines 16 and 19 comprise such conventional signals as address strobe, data strobe, read/write and the like. The address and data lines 17, 18, 20 and 21 each comprises a parallel 32 bit bus with the data busses 18 and 21 configured for two-way communication such that the processors 10 and 11 can present data to the bus and receive data therefrom. As explained above, the control, address and data signals from the shadow processor 11 on the lines 19-21 are one clock cycle behind the control, address and data signals on the lines 16-18 from the primary processor 10.

The system includes a CPU bus 22 comprised of a parallel 32 bit data bus 23 and a parallel 32 bit address bus 24. The primary processor 10 places addresses on the address bus 24 from the local address bus 17 via an interconnecting bus 25. The local data bus 18 of the primary processor 10 is coupled to the CPU data bus 23 via an interconnecting bus 26 for two way data communication between the primary processor 10 and the CPU bus 22.

The processor architecture of FIG. 1 includes a DRAM memory system 27 coupled to the CPU bus 22. The memory system 27 includes a DRAM memory 28 comprising a plurality of memory banks in conventional configuration. Bank selection is effected by a bank select signal on lines 29. Conventional RAS/CAS (Row Address Strobe/Column Address Strobe) signals are applied to the memory 28 via lines 30. The DRAM memory system 27 is addressed through a transceiver 31 and a multiplexer 32. Twenty-two of the 32 bits of address presented by the primary processor 10 to the CPU bus 22 are multiplexed in the multiplexer 32 onto 11 address lines that appear as row and column addresses to the DRAM memory 28. A multiplex select signal is applied at an input 33 of the multiplexer 32 to select between row and column addresses in a manner well understood in DRAM memory technology The remaining 10 address bits are not multiplexed and are utilized to control which memory bank is being addressed (bank select 29) and to determine the circuit card within the system on which the memory 28 is located. The non-multiplexed address signals on the address bus include the bank select signal on the lines 29, the RAS/CAS signals on the lines 30 and the MUX select signal on the line 33. It is appreciated that these signals are provided directly from the transceivers 31 for application to the multiplexer 32 and the DRAM memory 28. The address bus also includes a CPU grant line which enables the transceivers 31 via a line 34.

The DRAM memory 28 is coupled to the data bus 23 for data transfer into and out of the memory via transceivers 35. The CPU grant signal on the line 34 is applied to enable the transceivers 35 as well as the transceivers 31 as described above. The transceivers 31 and 35 and the multiplexer 32 comprise a memory interface or additional levels of logic through which the data and address signals must pass in order for communication to occur between the primary processor 10 and the memory system 27. The present invention tests for faults that might occur at this interface.

Data presented by the data bus 23 through the transceivers 35 for entry into the memory 28 are input to error detection and correction (EDC) circuit 36 as well as to the DRAM memory 28. In a conventional manner, the EDC circuit 36 generates 7 syndrome bits unique to the 32 bit data pattern and the syndrome bits are stored along with the data in memory 28 via lines 37. As is well known, the 7 syndrome bits can be utilized to correct any single bit error in the data and to detect all double bit and most multiple bit errors. When data is read from the memory 28, the EDC circuit 36 checks the data provided by the DRAM memory 28 against the 7 syndrome bits stored along with the data to detect any errors which may have occurred within the memory 28. Accordingly, an EDC error signal is provided by the EDC circuit 36 on a line 38. In accordance with the invention, the 7 syndrome bits are utilized to detect, in a manner to be described, if the data in memory becomes corrupted by the memory interface.

The multiplexed address signals provided by the multiplexer 32 to the memory 28 are also applied to the ASIC 12 via lines 39. The non-multiplexed signals on the address bus are also applied to the ASIC 12 via lines 40. The non-multiplexed signals comprise CPU-GRANT, MUX-SEL, BANK-SEL, RAS and CAS. For reasons to be described, the shadow comparison ASIC 12 reconstructs the 32 bits of address from the 11 multiplexed signals and the non-multiplexed signals. Additionally, the 7 syndrome bits are applied to the shadow comparison ASIC 12 on the lines 37 for reasons to be described.

In a manner to be hereinafter described, the ASIC 12 may be configured to provide the shadow comparisons of the present invention and also as a DRAM memory controller to control the DRAM memory system 27. In this regard, the signals CPU-GRANT, MUX-SEL, BANK-SEL, RAS and CAS are among various control signals utilized to indicate to the DRAM memory controller ASIC when the multiplexed lines contain valid data to be latched. In a manner to be further explained, the shadow comparison ASIC 12 performs data and memory address comparisons to provide a processor fail signal on a line 41 should a failure be detected with respect to the primary processor 10 and the shadow processor 11 and a memory fail signal on a line 42 should data and address comparisons detect failure.

The processor system illustrated in FIG. 1 also includes a cache memory system 43 coupled to the CPU bus 22. The cache memory system 43 includes a cache tag chip 44 and a cache data chip 45. Conventional parity circuits 46 and 47 are associated with the cache tag chip 44 and the cache data chip 45, respectively, in a conventional manner.

Referring to FIG. 2, in which like reference numerals indicate like elements with respect to FIG. 1, details of the shadow comparison ASIC 12 are illustrated. The common input signals such as clock, reset, interrupts, BERR and BGACK are applied at the input 13 and out to the primary processor 10 on the lines 14. The common inputs are also applied through delay amplifiers 50 to the shadow processor 11. As described above, the delay amplifiers 50 introduce a one clock cycle delay such that the shadow processor 11 executes one clock cycle behind the primary processor 10. The control, address and data signals from the primary processor 10 on the lines 16-18 are latched into a control latch 51, an address latch 52 and a data latch 53, respectively. The latches 51-53 comprise an internal register in the ASIC 12 for storing these signals for comparison with the shadow processor 11 on the next clock cycle. Accordingly, the outputs of the latches 51-53 are applied as inputs to a comparator 54 which also receives inputs from the shadow processor output lines 19-21 to effect the required comparisons. The output of the comparator 54 provides the processor fail signal on the line 41 in the event that the shadow processor 11 does not exactly track the primary processor 10 with respect to the signals on the control, address and data lines 16-21.

The shadow processor ASIC 12 also includes an EDC circuit 55 identical to the EDC circuit 36 described above with respect to FIG. 1. The EDC circuit 55 generates 7 syndrome bits utilizing the data in the data latch 53. The EDC signals from the EDC circuit 55 are applied as an input to a comparator 56 which also receives an input from the EDC signals from the EDC circuit 36. In a matter to be described, if the outputs of the EDC circuits 55 and 36 do not match, the comparator 56 provides the memory fail signal on the line 42 through an OR circuit 57.

The non-multiplexed address signals on the lines 40 and the multiplexed address signals on the lines 39 are applied to a reconstruct address circuit 58 that reconstructs the 32 bits of address from the non-multiplexed and multiplexed signals. The 32 bit reconstructed address is stored in a latch 59 and the latched reconstructed 32 bit address is applied as an input to a comparator 60. The comparable address on lines 20 from the shadow processor 11 are applied as a second input to the comparator 60. When the address reconstruction is complete, if the reconstructed address does not compare with the address presented by the shadow processor 11 on the lines 20, the output of the comparator 60 provides the memory fail signal on the line 42 through the OR circuit 57.

With continued reference to FIGS. 1 and 2, a write operation with the DRAM memory system 27 will now be described. When a write operation occurs, the primary processor 10 presents the 32 bits of address and 32 bits of data on the CPU bus 22. The shadow comparison ASIC 12 latches these signals in the internal register 51-53 to be compared on the next clock cycle with the data from the shadow processor 11. The 32 bits of data on lines 18 propagate through the transceivers 35 and are input to the EDC circuit 36 as well as to the DRAM memory 28. The EDC circuit 36 generates the 7 syndrome bits unique to the 32 bit data pattern which are then stored along with the data in the DRAM memory 28. The 7 syndrome bits generated by the EDC circuit 36 are utilized by the shadow comparison ASIC 12 to detect if the data in the memory 28 had been corrupted by traversal through the transceivers 35. The 7 syndrome bits from the EDC circuit 36, which represent the 32 bits of data, are sent to the shadow comparison ASIC 12. Inside the ASIC 12, the identical EDC circuit 55 generates 7 syndrome bits utilizing the latched data. The shadow comparison ASIC 12 then, utilizing the comparator 56, compares the EDC syndrome bits generated at the DRAM memory system 27 with those generated inside the shadow comparison ASIC 12 to assure that the data written to memory is identical to the data at the output pins of the primary processor 10. Since only 7 bits of EDC signals are compared, rather than the full 32 data bits, this technique reduces the number of pins that would otherwise be required for the ASIC 12 package. The shadow comparison ASIC 12, utilizing the comparator 54, also compares the 32 bits of data from the primary processor 10 with the 32 bits of data from the shadow processor 11 to detect any error occurring within the processors. By utilizing the comparators 54 and 56 as described, the shadow comparison ASIC 12 can differentiate a processor fault from a memory system fault.

As previously explained, 22 of the 32 bits of address presented by the primary processor 10 to the CPU bus 22 are multiplexed onto 11 address signals that appear as row and column addresses to the DRAM memory 28. The remaining bits are not multiplexed and are used for control purposes as described above. The shadow comparison ASIC 12 reconstructs the 32 bits of address from the 11 multiplexed signals and the non-multiplexed signals utilizing the reconstruct address circuit 58. When complete, the shadow comparison ASIC 12 compares, utilizing the comparator 60, the reconstructed address with the address presented by the shadow processor 11 on the lines 20 to detect any errors which may have occurred.

With continued reference to FIGS. 1 and 2, a read operation utilizing the DRAM memory system 27 will now be described. During a read operation, the primary processor 10 places an address on the CPU bus 22 of a location to be read. To assure that the proper address is presented to the DRAM memory 28, the shadow comparison ASIC 12 reconstructs the address from the 11 multiplexed signals and the non-multiplexed signals as described above for the write operation. The EDC circuit 36 checks the data read out of the DRAM memory 28 against the 7 syndrome bits stored along with the data to detect any errors which may have occurred within the DRAM memory 28. Such a detected error is manifested by a signal on the line 38. The data propagates back through the transceivers 35 to the primary processor 10 and the shadow ASIC 12. The 7 syndrome bits read out of the DRAM memory 28 along with the corresponding data are also sent to the shadow comparison asic 12 via the lines 37 and are compared, utilizing the comparator 56, against syndrome bits calculated by the EDC circuit 55 utilizing the read data which now resides in the data latch 53. Finally, the address from the primary processor 10, latched in the address latch 52, is compared on the next clock cycle with the address output on the lines 20 by the shadow processor 11. This procedure assures that the correct memory location was read and the returned data is correct and error free.

Integrity of the cache memory 43 is determined simply by utilizing the lock stepping shadow processor 11. Since the address and data presented by the primary processor 10 to the CPU bus 22 is unbuffered (no intervening logic) and used by the cache memory chips 44 and 45 directly, a simple comparison by the shadow comparison ASIC 12, utilizing the comparator 54, with the address and data from the shadow processor 11 on the next clock cycle is a sufficient check. During a write operation, a parity bit is calculated for each 8 address and data bits (byte parity) utilizing the parity circuits 46 and 47 and stored with the information in the cache chips 44 and 45. Parity provides a detection mechanism for all single bit and some multiple bit errors occurring within the memories.

During a read operation, the address presented to the cache memories 43 by the primary processor 10 is compared by the comparator 54 with the address generated by the shadow processor 11. The data read from the cache memories 43 is checked for errors by the parity circuits 46 and 47 and, if uncorrupted, sent to both the primary processor 10 and the shadow processor 11. Corrupted data will cause a cache miss and the data is then retrieved from the main or DRAM memory 28.

The implementation of the ASIC 12 is designed to provide two independent sets of functionality; viz, comparison of the primary processor 10 and the shadow processor 11 and a DRAM memory controller. Because of the substantial commonality of inputs and outputs of these two functions, a single implementation is feasable. Two ASICs are required in a fault tolerant computer system design—one utilized as a shadow comparison ASIC and one utilized as a DRAM memory controller. A mode select input signal changes the function of the external pins and internal functionality from shadow comparison to DRAM memory controller.

Figure 3A:
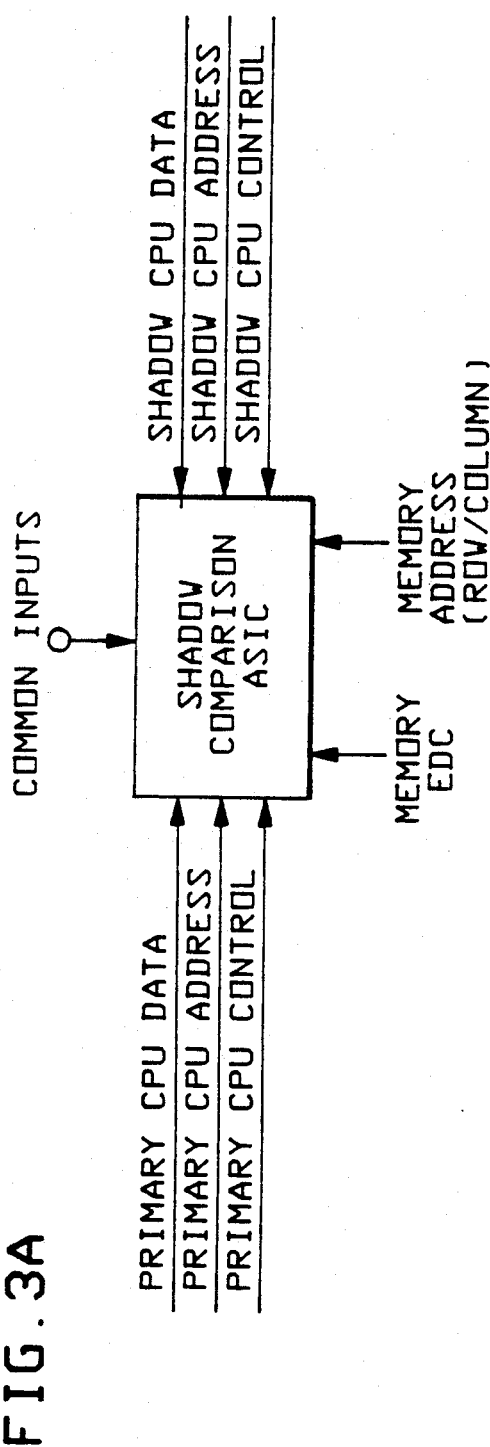
FIGS. 3a and 3b are schematic block diagrams illustrating the commonality of inputs and outputs between the shadow comparison ASIC and the DRAM memory controller, such that both can be implemented on a single ASIC.
Figure 3B:
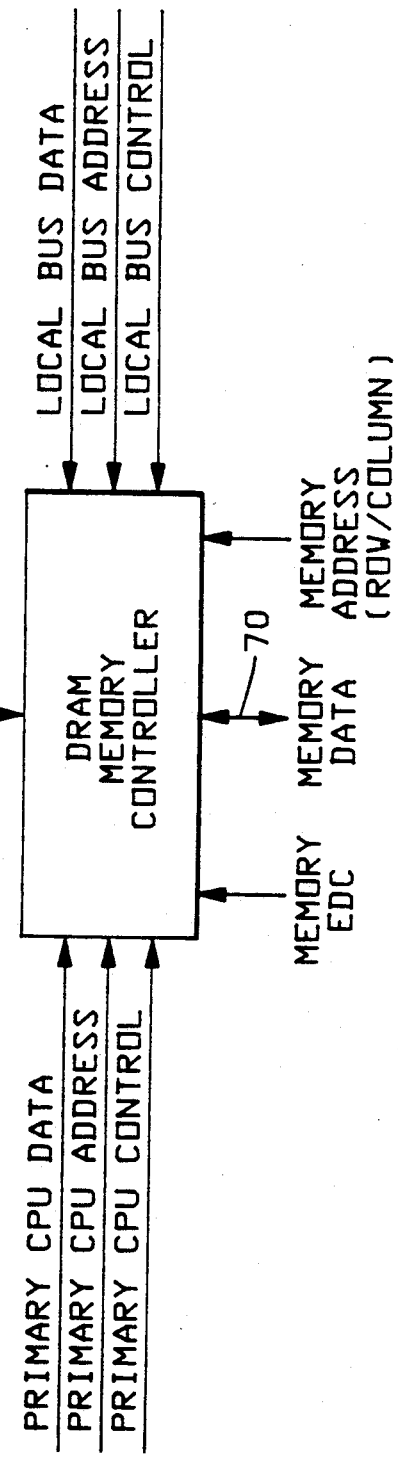

Referring to FIGS. 3a and 3b, the dual functionality achieved in a single ASIC is illustrated. FIG. 3a illustrates the shadow comparison ASIC and FIG. 3b illustrates the DRAM memory controller ASIC. The commonality of inputs and outputs is apparent from a comparison of the two figures. A line 70, having dual pin functionality, provides the shadow comparison function control so as to selectively implement each of the modes. FIG. 3b illustrates a dual port DRAM controller. The DRAM memory controller functionality of FIG. 3b is generally illustrated within the dashed block 80 of FIG. 1.

The functionality of the ASIC in the shadow comparison mode was described above in the operation of the architecture. The primary functions provided by this circuit in the shadow comparison mode are:
Primary and shadow processor address, data, and control signal comparison
Primary processor data EDC generation
EDC compare
Memory address latch
CPU/memory address compare
CPU synchronization control (clock, reset, delayed lock step, etc.)

The primary functions provided by the ASIC in the DRAM memory controller mode are:
Dual port memory access
Address buffers and multiplexers
Data buffers and latches
Memory timing and control (RAS, CAS, etc.)
EDC generation The present invention provides a very high data integrity fault tolerant processor by utilizing off-the-shelf microprocessor and memory components to achieve a low system cost. In effect, the invention compares the signals of the CPU/FPU pairs with the equivalent signals at the DRAM chips. The invention utilizes reconstruction of the 32 bits of address and EDC generation of the data at the point where the data is presented to the memories and utilizing these signals to compare with the shadow processor. Additionally, the ASIC is implemented to accomplish two unique sets of functionality; viz, shadow comparison and DRAM memory controller.

It is appreciated from the foregoing, that the present invention provides a low cost, compact fault tolerant processor/memory architecture for use in systems that require the utmost of reliability and fault detection. The invention utilizes dual microprocessors running at full speed in delayed lock step with comparison for error detection. The invention utilizes CPU data EDC generation and comparison with memory data EDC generation to maintain data integrity. The invention utilizes CPU address comparison with memory address to maintain address integrity.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A fault tolerant computer system comprising
a first processor,
a second processor adapted to run in lock step with respect to said first processor,
a memory system,
memory interface means coupling said first processor to said memory system for conveying address signals from said first processor to said memory system, and
comparison means for comparing address signals received by said memory system through said memory interface means from said first processor with corresponding address signals from said second processor and for providing a failure signal when a miscomparison occurs,
thereby testing the integrity of said address signals conveyed through said memory interface means from said first processor to said memory system.

2. The system of claim 1 wherein said memory interface means is further operative to couple said first processor to said memory system for conveying data signals between said first processor and said memory system, and said system further comprises
further comparison means for comparing error detection and correction (EDC) signals derived from data signals sent by said first processor for conveyance through said memory interface means to said memory system with EDC signals derived from data signals received by said memory system through said memory interface means from said first processor, and for comparing EDC signals derived from data signals sent by said memory system for conveyance through said memory interface means to said first processor with EDC signals derived from data signals received by said first processor through said memory interface means from said memory system, and for providing a further failure signal when a miscomparison occurs,
thereby testing the integrity of said data signals conveyed through said memory interface means between said first processor and said memory system.

3. The system of claim 2 wherein
said memory system includes first EDC circuit means responsive to data signals conveyed through said memory interface means to said memory system for providing a first EDC signal corresponding thereto,
said further comparison means includes second EDC circuit means responsive to data signals provided by said first processor for conveyance through said memory interface means to said memory system for providing a second EDC signal corresponding thereto, and
said further comparison means includes means responsive to said first and second EDC signals for comparing said first and second EDC signals to provide said further failure signal in response to a miscomparison therebetween.

4. The system of claim 2 wherein
said memory system includes first EDC circuit means responsive to data signals conveyed through said memory interface means from said first processor to said memory system for providing a first EDC signal corresponding thereto,
said memory system further includes means for storing said first EDC signal along with said data signal corresponding thereto,
said further comparison means includes second EDC circuit means responsive to data signals conveyed through said memory interface means from said memory system to said first processor for providing a second EDC signal corresponding thereto, and said further comparison means includes means responsive to said first EDC signal stored in said memory system and said second EDC signal for comparing said first and second EDC signals to provide said further failure signal in accordance with miscomparisons therebetween.

5. The system of claim 1 wherein said memory interface means comprises transceivers and multiplexer means.

6. The system of claim 5 wherein said address signals conveyed through said memory interface means comprises multiplexed address signals conveyed through said multiplexer means and non-multiplexed signals conveyed through said transceivers.

7. The system of claim 6 wherein said comparison means comprises reconstructing means responsive to said multiplexed address signals and said non-multiplexed address signals for recombining said multiplexed address signals with said non-multiplexed address signals to provide a recombined address signal, and means responsive to said recombined address signal and said corresponding address signal from said second processor for comparing said recombined address signal with said corresponding address signal to provide said failure signal in accordance with miscomparisons therebetween.

8. The system of claim 1 further including further comparison means for comparing first output signals from said first processor and second output signals from said second processor and for providing a further failure signal when a miscomparison occurs.

9. The system of claim 8 wherein said first output signals comprise control, address and data signals from said first processor and said second output signals comprise corresponding control, address and data signals from said second processor.

10. The system of claim 9 further including means for providing common inputs to said first and second processors.

11. The system of claim 10 further including means for delaying said common inputs provided to said second processor.

12. The system of claim 8 including an integrated circuit chip containing said comparison means and said further comparison means and means for controlling said memory system.

* * * * *